US011658885B2

(12) United States Patent
Pendyala et al.

(10) Patent No.: US 11,658,885 B2
(45) Date of Patent: May 23, 2023

(54) AUTOMATING EVALUATION OF QOE FOR WIRELESS COMMUNICATION SERVICES

(71) Applicant: SPIRENT COMMUNICATIONS, INC., San Jose, CA (US)

(72) Inventors: Swetha Pendyala, Old Bridge, NJ (US); Peter Peng, Spring Lake, NJ (US); Ovidiu Reghis, Marlboro, NJ (US); Marius Adamut, Hazlet, NJ (US)

(73) Assignee: SPIRENT COMMUNICATIONS, INC., San Jose, CA (US)

(*) Notice: Subject to any disclaimer, the term of this patent is extended or adjusted under 35 U.S.C. 154(b) by 706 days.

(21) Appl. No.: 16/148,835

(22) Filed: Oct. 1, 2018

(65) Prior Publication Data
US 2020/0106682 A1 Apr. 2, 2020

(51) Int. Cl.
| | |
|---|---|
| *G06F 16/00* | (2019.01) |
| *H04L 41/50* | (2022.01) |
| *G06F 16/242* | (2019.01) |
| *H04L 43/55* | (2022.01) |

(52) U.S. Cl.
CPC ...... *H04L 41/5032* (2013.01); *G06F 16/2423* (2019.01); *H04L 43/55* (2022.05)

(58) Field of Classification Search
CPC ............ H04L 41/5032; H04L 41/5038; H04L 41/024; H04L 41/5009; G06F 16/2423
See application file for complete search history.

(56) References Cited

U.S. PATENT DOCUMENTS

| | | | | |
|---|---|---|---|---|
| 7,689,455 | B2 * | 3/2010 | Fligler | G06Q 10/0639 |
| | | | | 705/7.38 |
| 9,378,228 | B2 | 6/2016 | Wankawala | |
| 9,424,121 | B2 * | 8/2016 | Kushnir | G06F 11/0709 |
| 9,432,865 | B1 | 8/2016 | Jadunandan et al. | |
| 9,485,679 | B2 * | 11/2016 | Kreher | H04W 24/08 |

(Continued)

OTHER PUBLICATIONS

U.S. Appl. No. 15/352,550—Notice of Allowance dated Mar. 27, 2019, 8 pages.

(Continued)

*Primary Examiner* — Paul Kim
(74) *Attorney, Agent, or Firm* — Haynes Beffel & Wolfeld LLP; Ernest J. Beffel, Jr.; Franklin M. Schellenberg

(57) ABSTRACT

The disclosed technology teaches automating evaluation of QoE for data communication services in a wireless network—accessing performance indicators, mappings for the performance indicators to SKQIs in a SKQI parameters table, and mappings for SKQIs to KQIs in an SKQI-to-KQI mapping table. The disclosed method includes configuring first and second functions that, respectively, roll up performance indicators into SKQIs based on parameters stored in the SKQI parameters table to calculate SKQI scores and weights, and roll up SKQIs into KQIs and QoE based on parameters stored in SKQI-to-KQI and SKQI-to-QoE mapping tables, to calculate KQI and QoE scores. Also disclosed is generating first SQL statements that invoke the first function to calculate the SKQIs and second SQL statements that invoke the second function to calculate KQIs and QoE, storing generated first and second SQL statements in non-volatile storage and calculating KQIs and QoE using the automatically generated SQL statements.

22 Claims, 16 Drawing Sheets

(56) References Cited

U.S. PATENT DOCUMENTS

| | | | |
|---|---|---|---|
| 2002/0078058 A1 | 6/2002 | Bird et al. | |
| 2005/0278276 A1 | 12/2005 | Andreev et al. | |
| 2010/0027432 A1* | 2/2010 | Gopalan | H04L 41/142 370/252 |
| 2011/0129089 A1 | 6/2011 | Kim et al. | |
| 2012/0166483 A1 | 6/2012 | Choudhary et al. | |
| 2013/0198767 A1* | 8/2013 | Wang | H04N 21/6583 725/14 |
| 2013/0238657 A1 | 9/2013 | Brand et al. | |
| 2015/0271827 A1* | 9/2015 | Hamalainen | H04W 72/0486 455/452.2 |
| 2016/0072927 A1 | 3/2016 | Xue et al. | |
| 2017/0116335 A1 | 4/2017 | Baby | |
| 2019/0347271 A1 | 11/2019 | Adamut | |

OTHER PUBLICATIONS

U.S. Appl. No. 15/352,550—Response to Office Action dated Oct. 5, 2018 filed Jan. 23, 2019, 16 pages.

Muse, D., "SQL Relay," Copyright 2014, Retrieved online: http://sqlrelay.sourceforge.net/documentation.html, accessed on Aug. 8, 2016, 1 page.

U.S. Appl. No. 15/352,550—Non-final Office Action dated Oct. 5, 2018, 17 pages.

U.S. Appl. No. 16/525,463—Non-final Office Action dated Mar. 10, 2021, 18 pgs.

U.S. Appl. No. 16/525,463—Response to Office Action dated Mar. 10, 2021 filed Jun. 10, 2021, 11 pages.

U.S. Appl. No. 16/525,463—Notice of Allowance dated Jul. 14, 2021, 9 pages.

Neil et al., "KATS: Kernel-smoothed Adaptive Thresholds for Network Anomaly Detection", Los Alamos National Laboratory Associate Directorate for Theory, Simulation, and Computation (ADTSC) LA-UR 10-01992, Lambert, D. and C. Liu, J Am Stat Assoc 101, 78 (2006), pp. 82-83.

Spirent White Paper "Measuring Subscriber Quality of Experience (QoE)", Spirent, dated Jul. 2014, 8 pages.

Lambert et al., "Adaptive Thresholds: Monitoring Streams of Network Counts", Article in Journal of the American Statistical Association, Mar. 2006, vol. 101, No. 473, Applications and Case Studies, DOI: 10.2307/30047442, Source: RePEc, pp. 78-88.

Spirent White Paper, "Transforming for NFV: VisionWorks for Lifecycle Service Assurance", pp. 1-14, 2017.

U.S. Appl. No. 16/137,442—Office Action dated Apr. 18, 2019, 22 pages.

U.S. Appl. No. 16/137,442—Proposed Examiner's Amendment and Interview Summary filed Sep. 27, 2019, 8 pages.

U.S. Appl. No. 16/137,442—Notice of Allowance dated Oct. 11, 2019, 12 pages.

U.S. Appl. No. 16/137,442—Response to Office Action dated Apr. 18, 2019, filed Jul. 18, 2019, 11 pages.

\* cited by examiner

Rows of KPI to SKQI Parameter Mappings 315

| # | skqi | total |
|---|---|---|
| 1 | | |
| 2 | Attach failure rate | attach_attempts |
| 3 | Authentication failure rate | authentication_attempts |
| 4 | CS Call Drop Rate, cell reasons | mo_voice_call_attempts+mt_voice_call_attempts - mo_voice_call_ineffective_attempts - mt_voice_call_ineffective_attempts |
| 5 | Call Drop Rate, core reasons | mo_voice_call_attempts+mt_voice_call_attempts - mo_voice_call_ineffective_attempts - mt_voice_call_ineffective_attempts |
| 6 | CS Call Drop Rate, device reasons | mo_voice_call_attempts+mt_voice_call_attempts - mo_voice_call_ineffective_attempts - mt_voice_call_ineffective_attempts |
| 7 | CS Call Setup Ineffective Attempt Rate, cell reasons | mo_voice_call_attempts+mt_voice_call_attempts |
| 8 | Call Setup Ineffective Attempt Rate, core reasons | mo_voice_call_attempts+mt_voice_call_attempts |
| 9 | CS Call Setup Ineffective Attempt Rate, device reasons | mo_voice_call_attempts+mt_voice_call_attempts |
| 10 | Data session setup failure rate | session_setup_attempts |
| 11 | Data session setup failure rate, cell reasons | session_setup_attempts |
| 12 | Data session setup failure rate, core reasons | session_setup_attempts |
| 13 | Data session setup failure rate, device reasons | session_setup_attempts |
| 14 | DNS Setup Failure Rate | dns_setup_attempts |
| 15 | High volume throughput (kbps) | high_volume_active_time_ms |
| ... | | |
| 47 | VoLTE Video Call Ineffective Attempt Rate, cell reasons | mo_volte_video_call_attempts+mt_volte_video_call_attempts |
| 48 | VoLTE Video Call Ineffective Attempt Rate, core reasons | mo_volte_video_call_attempts+mt_volte_video_call_attempts |
| 49 | VoLTE Video Call Ineffective Attempt Rate, device reasons | mo_volte_video_call_attempts+mt_volte_video_call_attempts |
| 50 | VoLTE Voice Calls Drop Rate | mo_volte_voice_call_attempts + mt_volte_voice_call_attempts - mo_volte_voice_call_ineffective_attempts - mt_volte_voice_call_ineffective_attempts - |
| 51 | VoLTE Voice Call Drop Rate, cell reasons | mo_volte_voice_call_attempts + mt_volte_voice_call_attempts - mo_volte_voice_call_ineffective_attempts - mt_volte_voice_call_ineffective_attempts - |
| 52 | VoLTE Voice Call Drop Rate, core reasons | mo_volte_voice_call_attempts + mt_volte_voice_call_attempts - mt_volte_voice_call_ineffective_attempts - mt_volte_voice_call_ineffective_attempts - |
| 53 | VoLTE Voice Call Drop Rate, device reasons | mo_volte_voice_call_attempts + mt_volte_voice_call_attempts |
| 54 | VoLTE Voice Call Ineffective Attempt Rate | mo_volte_voice_call_attempts + mt_volte_voice_call_attempts |
| 55 | VoLTE Voice Call Ineffective Attempt Rate, cell reasons | mo_volte_voice_call_attempts + mt_volte_voice_call_attempts |
| 56 | VoLTE Voice Call Ineffective Attempt Rate, core reasons | mo_volte_voice_call_attempts + mt_volte_voice_call_attempts |
| 57 | VoLTE Voice Call Ineffective Attempt Rate, device reasons | mo_volte_voice_call_attempts + mt_volte_voice_call_attempts |

| kqi_key_name | | kqi | service | kqi |
|---|---|---|---|---|
| 1 | attach_failure_rate | Attach failure rate | Data | core_kqi |
| 2 | attach_failure_rate | Attach failure rate | Data | data_ctrl_kqi |
| 3 | attach_failure_rate | Attach failure rate | Data | data_kqi |
| 4 | attach_failure_rate | Attach failure rate | Data | data_kqi_core |
| 5 | attach_failure_rate | Attach failure rate | Data | qoe |
| 6 | authentication_failure_rate | Authentication failure rate | Data | core_kqi |
| 7 | authentication_failure_rate | Authentication failure rate | Data | data_ctrl_kqi |
| 8 | authentication_failure_rate | Authentication failure rate | Data | data_kqi |
| 9 | authentication_failure_rate | Authentication failure rate | Data | data_kqi_core |
| 10 | authentication_failure_rate | Authentication failure rate | Data | qoe |
| 11 | call_drop_rate_cell | CS Call Drop Rate, cell reasons | Voice | cell_kqi |
| 12 | call_drop_rate_cell | CS Call Drop Rate, cell reasons | Voice | voice_kqi_cell |
| 13 | call_drop_rate_core | CS Call Drop Rate, core reasons | Voice | core_kqi |
| 14 | call_drop_rate_core | Call Drop Rate, core reasons | Voice | voice_kqi_core |
| 15 | call_drop_rate_device | CS Call Drop Rate, device reasons | Voice | device_kqi |
| 16 | call_drop_rate_device | CS Call Drop Rate, device reasons | Voice | voice_kqi_device |
| 17 | call_setup_ineffective_attempt_rate_cell | CS Call Setup Ineffective Attempt Rate, cell reasons | Voice | cell_kqi |
| 18 | call_setup_ineffective_attempt_rate_cell | CS Call Setup Ineffective Attempt Rate, cell reasons | Voice | voice_kqi_cell |
| 19 | call_setup_ineffective_attempt_rate_core | Call Setup Ineffective Attempt Rate, core reasons | Voice | core_kqi |
| 20 | call_setup_ineffective_attempt_rate_core | Call Setup Ineffective Attempt Rate, core reasons | Voice | voice_kqi_core |
| 21 | call_setup_ineffective_attempt_rate_device | Call Setup Ineffective Attempt Rate, device reasons | Voice | device_kqi |
| 22 | call_setup_ineffective_attempt_rate_device | CS Call Setup Ineffective Attempt Rate, device reasons | Voice | voice_kqi_device |
| 23 | data_session_setup_failure_rate | Data session setup failure rate | Data | data_ctrl_kqi |
| 24 | data_session_setup_failure_rate | Data session setup failure rate | Data | data_kqi |
| 25 | data_session_setup_failure_rate | Data session setup failure rate | Data | qoe |
| 26 | data_session_setup_failure_rate_cell | Data session setup failure rate, cell reasons | Data | cell_kqi |
| 27 | data_session_setup_failure_rate_cell | Data session setup failure rate, cell reasons | Data | data_kqi_cell |
| 28 | data_session_setup_failure_rate_core | Data session setup failure rate, core reasons | Data | core_kqi |
| 29 | data_session_setup_failure_rate_core | Data session setup failure rate, core reasons | Data | data_kqi_core |
| 30 | data_session_setup_failure_rate_device | Data session setup failure rate, device reasons | Data | data_kqi_device |
| 31 | data_session_setup_failure_rate_device | Data session setup failure rate, device reasons | Data | device_kqi |
| 32 | dns_requests_failure_rate | DNS Setup Failure Rate | Data | data_kqi |
| 33 | dns_requests_failure_rate | DNS Setup Failure Rate | Data | data_user_kqi |
| 34 | dns_requests_failure_rate | DNS Setup Failure Rate | Data | qoe |

FIG. 5

| | A | B | C | D | E | F |
|---|---|---|---|---|---|---|
| 1 | skqi_key_name | | skqi | service | kqi | x_is_kqi_enabled |
| 11 | call_drop_rate_cell | | CS Call Drop Rate, cell reasons | voice | cell_kqi | yes |
| 17 | call_setup_ineffective_attempt_rate_cell | | CS Call Setup Ineffective Attempt Rate, cell reasons | Voice | cell_kqi | yes |
| 26 | data_session_setup_failure_rate_cell | | Data session setup failure rate, cell reasons | Data | cell_kqi | yes |
| 43 | message_failure_rate_cell | | Message failure rate, cell reasons | SMS | cell_kqi | yes |
| 53 | rab_drop_rate_cell | | Radio Bearer Drop Rate, Cell Reasons | Data | cell_kqi | yes |
| 61 | rab_handover_failure_rate | | Handover Failure Rate | Data | cell_kqi | yes |
| 69 | rab_setup_failure_rate_cell | | Radio Bearer Setups Failure Rate, Cell Reasons | Data | cell_kqi | yes |
| 103 | volte_video_calls_drop_rate_cell | | VoLTE Video Call Drop Rate, cell reasons | VoLTE | cell_kqi | yes |
| 113 | volte_video_calls_ineffective_attempt_rate_cell | | VoLTE Video Call Ineffective Attempt Rate, cell reasons | VoLTE | cell_kqi | yes |
| 123 | volte_voice_calls_drop_rate_cell | | VoLTE Voice Call Drop Rate, cell reasons | VoLTE | cell_kqi | yes |
| 129 | volte_voice_calls_ineffective_attempt_rate_cell | | VoLTE Voice Call Ineffective Attempt Rate, cell reasons | VoLTE | cell_kqi | yes |

FIG. 6

| | skqi_key | name | skqi | | service | kqi_3 | is_kqi_enabled |
|---|---|---|---|---|---|---|---|
| 1 | 5 | attach_failure_rate | Attach failure rate | | Data | qoe | yes |
| 2 | 10 | authentication_failure_rate | Authentication failure rate | | Data | qoe | yes |
| 3 | 25 | data_session_setup_failure_rate | Data session setup failure rate | | Data | qoe | yes |
| 4 | 34 | dns_requests_failure_rate | DNS Setup Failure Rate | | Data | qoe | yes |
| 5 | 37 | high_volume_throughput | High volume throughput (kbps) | | Data | qoe | yes |
| 6 | 40 | low_volume_throughput | Low volume throughput (kbps) | | Data | qoe | yes |
| 7 | 41 | message_failure_rate | Message failure rate | | SMS | qoe | yes |
| 8 | 51 | packet_retransmission_rate | Packet re-transmission rate | | Data | qoe | yes |
| 9 | 54 | rab_drop_rate | Radio Bearer Drop Rate | | Data | qoe | yes |
| 10 | 65 | rab_handover_failure_rate | Handover Failure Rate | | Data | qoe | yes |
| 11 | 68 | rab_setup_failure_rate | Radio Bearer Setup Failure Rate | | Data | qoe | yes |
| 12 | 77 | response_time | Response Time | | Data | qoe | yes |
| 13 | 80 | tcp_session_setup_failure_rate | TCP Session Setup Failure Rate | | Data | qoe | yes |
| 14 | 81 | voice_call_drop_rate | Voice Call Drop Rate | | Voice | qoe | yes |
| 15 | 83 | voice_call_ineffective_attempt_rate | Voice Call Ineffective Attempt Rate | | Voice | qoe | yes |
| 16 | 85 | voice_calls_long_setup_time | Voice Calls Long Setup Time | | Voice | qoe | yes |
| 17 | 87 | voice_handover_failure_rate | Voice Handover Failure Rate | | Voice | qoe | yes |
| 18 | 89 | volte_calls_with_low_quality | VoLTE Calls with low quality | | VoLTE | qoe | yes |
| 19 | 92 | volte_dedicated_bearer_setup_failure_rate | VoLTE Dedicated Bearer Setup Failure Rate | | VoLTE | qoe | yes |
| 20 | 95 | volte_dl_mos | VoLTE User Plane MOS DL | | VoLTE | qoe | yes |
| 21 | 98 | volte_initial_registration_failure_rate | VoLTE Initial Registration Failure Rate | | VoLTE | qoe | yes |
| 22 | 101 | volte_ul_mos | VoLTE User Plane MOS UL | | VoLTE | qoe | yes |
| 23 | 103 | volte_video_calls_drop_rate | VoLTE Video Calls Drop Rate | | VoLTE | qoe | yes |
| 24 | 111 | volte_video_calls_ineffective_attempt_rate | VoLTE Video Calls Ineffective Attempt Rate | | VoLTE | qoe | yes |
| 25 | 119 | volte_voice_calls_drop_rate | VoLTE Voice Calls Drop Rate | | VoLTE | qoe | yes |
| 26 | 127 | volte_voice_calls_ineffective_attempt_rate | VoLTE Voice Calls Ineffective Attempt Rate | | VoLTE | qoe | yes |

FIG. 7

```
insert /*+ direct */ into agg_d_sub_sql_f (
 data_key
,subscriber_key
,enterprise_key
,subscriber_class_key
,custom_group_key
,authentication_failure_rate_score
,authentication_failure_rate_weight
,call_drop_rate_cell_score
,call_drop_rate_cell_weight
,call_drop_rate_core_score
,call_drop_rate_core_weight
,call_drop_rate_device_score
,call_drop_rate_device_weight
,call_setup_ineffective_attempt_rate_cell_score
,call_setup_ineffective_attempt_rate_cell_weight
,call_setup_ineffective_attempt_rate_core_score
...
,volte_voice_calls_ineffective_attempt_rate_cell_weight
,volte_voice_calls_ineffective_attempt_rate_core_score
,volte_voice_calls_ineffective_attempt_rate_core_weight
,volte_voice_calls_ineffective_attempt_rate_device_score
,volte_voice_calls_ineffective_attempt_rate_device_weight
,volte_voice_calls_drop_rate_score
,volte_voice_calls_drop_rate_weight
,attach_failure_rate_score
,attach_failure_rate_weight
,version_key
)
```

FIG. 8

```
select
date_key
,subscriber_key
,enterprise_key
,subscriber_class_key
,custom_group_key
,scoreFailureMetric(authentication_attempts
...
,scoreFailureMetric(attach_attempts,attach_failures,:
 attach_failure_rate_high_threshold,:attach_failure_rate_low_threshold,:
 attach_failure_rate_score_high_threshold,:
 attach_failure_rate_score_low_threshold) as attach_failure_rate_score
,weighScore(attach_attempts,attach_failures,:
 attach_failure_rate_daily_vol_threshold,:attach_failure_rate_high_threshold,:
 attach_failure_rate_min_weight,:attach_failure_rate_max_weight,:
 attach_failure_rate_delay_factor) as attach_failure_rate_weight
,:version::integer as version_key
from agg_d_sub_kpi_f
where
agg_d_sub_kpi_f.date_key >= :minDate
and agg_d_sub_kpi_f.date_key < :maxDate
and version_key = :version::integer
```

1104 — 1 insert /*+ direct */ into agg_d_sub_kqi_f ( — 1106
2 date_key
3 ,subscriber_key
4 ,enterprise_key
5 ,subscriber_class_key
6 ,custom_group_key
7 ,revenue_subs_qoe_impacted
8 ,ticket_count
1134 — 9 ,cell_kqi
10 ,core_kqi
11 ,data_ctrl_kqi
12 ,data_kqi
13 ,data_kqi_cell
14 ,data_kqi_core
15 ,data_kqi_device
16 ,data_user_kqi
17 ,device_kqi
1154 — 18 ,qoe
19 ,sms_kqi
20 ,sms_kqi_cell
21 ,sms_kqi_core
22 ,sms_kqi_device
23 ,voice_kqi
24 ,voice_kqi_cell
25 ,voice_kqi_core
26 ,voice_kqi_device
27 ,volte_kqi
28 ,volte_kqi_cell
29 ,volte_kqi_core
30 ,volte_kqi_device
31 ,version_key
32 )

FIG. 11

1204 — 33 select
34 date_key
35 ,subscriber_key
36 ,enterprise_key
37 ,subscriber_class_key
38 ,custom_group_key
39 ,0 as revenue_subs_qoe_impacted
40 ,0 as ticket_count
1234 — 41 ,weightedAvg(volte_video_calls_drop_rate_cell_score,
volte_video_calls_drop_rate_cell_weight, call_drop_rate_cell_score, call_drop_rate_cell_weight,
volte_video_calls_ineffective_attempt_rate_cell_score,
...
data_session_setup_failure_rate_cell_score, data_session_setup_failure_rate_cell_weight,
message_failure_rate_cell_score, message_failure_rate_cell_weight, rab_drop_rate_cell_score,
rab_drop_rate_cell_weight, rab_handover_failure_rate_score, rab_handover_failure_rate_weight,
rab_setup_failure_rate_cell_score, rab_setup_failure_rate_cell_weight) as cell_kqi —— 1248
...
1254 — 62 ,weightedAvg(volte_video_calls_drop_rate_device_score,
volte_video_calls_drop_rate_device_weight,
...
volte_voice_calls_ineffective_attempt_rate_device_weight) as volte_kqi_device —— 1268
63 .:version::integer as version_key
64 from agg_d_sub_skqi_f
65 where
66 agg_d_sub_skqi_f.date_key >= :minDate
67 and agg_d_sub_skqi_f.date_key < :maxDate
68 and version_key = :version::integer ;

FIG. 12

AUTOMATING EVALUATION OF QOE FOR WIRELESS COMMUNICATION SERVICES

RELATED APPLICATIONS

This application is related to U.S. patent application Ser. No. 16/137,442 filed on Sep. 20, 2018 and entitled "PREDICTING SUBSCRIBER EXPERIENCE BASED ON QOE" and is hereby incorporated by reference for all purposes.

FIELD OF THE TECHNOLOGY DISCLOSED

The technology disclosed relates generally to predicting individual subscriber experience for wireless networks based on a cumulative quality of experience derived from usage and performance data. More specifically, the technology discloses table-driven generation of structured query language (SQL) statements for calculation of key quality indicators (KQIs) and quality of experience (QoE), using flexible mapping of key performance indicators (KPIs) to sub key quality indicators (SKQIs) and flexible mapping of SKQIs to KQIs and QoE.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Network service providers care about the experience of their subscribers, even if the aggregate performance of devices or whole networks is at some very high level. In the world of service providers, individual subscribers often do not care how much bandwidth the big routers at the core of the Internet can deliver. They care about getting the bandwidth and the experiences for which they are paying. In one example, some subscribers are paying for more bandwidth so they can share their personal experiences in real-time—at a large outdoor concert in one example, via live streaming, utilizing video and audio traffic.

Measuring subscriber experience scores allows network service providers to improve their delivery of wireless network service. Existing systems for analyzing customer experience utilize aggregate quality of experience (QoE) scores and utilize fixed thresholds, considering the subscriber experience at a single time interval, for deciding when the communication services are adequate. Historically it has been very challenging to track the key performance indicators (KPIs) that have been implemented to express QoE.

Network engineers and operators continue to update existing metrics to improve network performance monitoring and analysis, and to identify new metrics for measuring network performance as new clients utilize existing systems and as technology advances with emerging technologies, such as next-generation 5G networks for wireless communications, with vastly increased capacity, lower latency, and faster speeds. To update and add new metrics, existing network measurement systems require time-consuming, potentially error-prone human-executed edits of complex calculation scenarios to accommodate the improvements to metrics and additions of new metrics for measuring network performance.

An opportunity arises to automatically generate table-driven structured query language (SQL) statements for calculating key quality indicators and quality of experience to objectively evaluate voice, voice over IP, data and short message service communication services to analyze subscriber experience. The disclosed automatic generation of SQL statements for calculating indicators and quality of experience for measuring network performance can save time and increase accuracy for network performance monitoring.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches automating evaluation of quality of experience (QoE) for data communication services in a diverse wireless communications network including accessing monitored performance indicators, mappings for the performance indicators to sub key quality indicators (SKQIs) represented by constants and variables stored in an SKQI parameters table, and mappings for SKQIs to key quality indicators (KQIs) in an SKQI-to-KQI mapping table. The disclosed technology includes configuring first and second functions that, respectively roll up the performance indicators into SKQIs based on parameters stored in the SKQI parameters table, by calculating SKQI scores and weights, and roll up SKQIs into KQIs based on parameters stored in the SKQI-to-KQI mapping table by calculating KQI scores. The technology also includes generating first structured query language (SQL) statements that, when executed, invoke the first function to calculate the SKQIs from the performance indicators, and second SQL statements that, when executed, invoke the second function to calculate the KQIs from results of the first SQL statements. Further, the disclosed technology includes storing the generated first SQL statements and second SQL statements in non-volatile storage and can also include calculating the SKQIs by executing the generated first SQL statements and calculating the KQIs by executing second SQL statements, and storing the calculated SKQIs and KQIs in non-volatile storage.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 3A shows an excerpt of example SKQI parameters table in which each of more than fifty rows represents a mapping of performance indicators to SKQIs.

FIG. 4B illustrates another use case example that utilizes calculated scores and weights, and includes hourly and daily volume thresholds.

FIG. 5 shows an excerpt of an example SKQI-to-KQI-and-SKQI-to-QoE mapping table of SKQIs to KQIs for data, voice, SMS and VoLTE services in a diverse wireless communications network.

FIG. 6 shows an excerpt of an example SKQI-to-KQI-and-SKQI-to-QoE mapping table, filtered to show SKQIs mapped to calculation of cell KQI.

FIG. 7 shows an excerpt of SKQI-to-KQI-and-SKQI-to-QoE mapping table, filtered for calculating QoE.

FIG. 8 and FIG. 9 show excerpts of the automatically generated SQL for use in calculation of SKQIs. FIG. 8 shows a command that inserts field values from SKQI parameters table for use by functions. FIG. 9 shows excerpts of generated SQL that are executable for calculating SKQIs.

Figure 10:
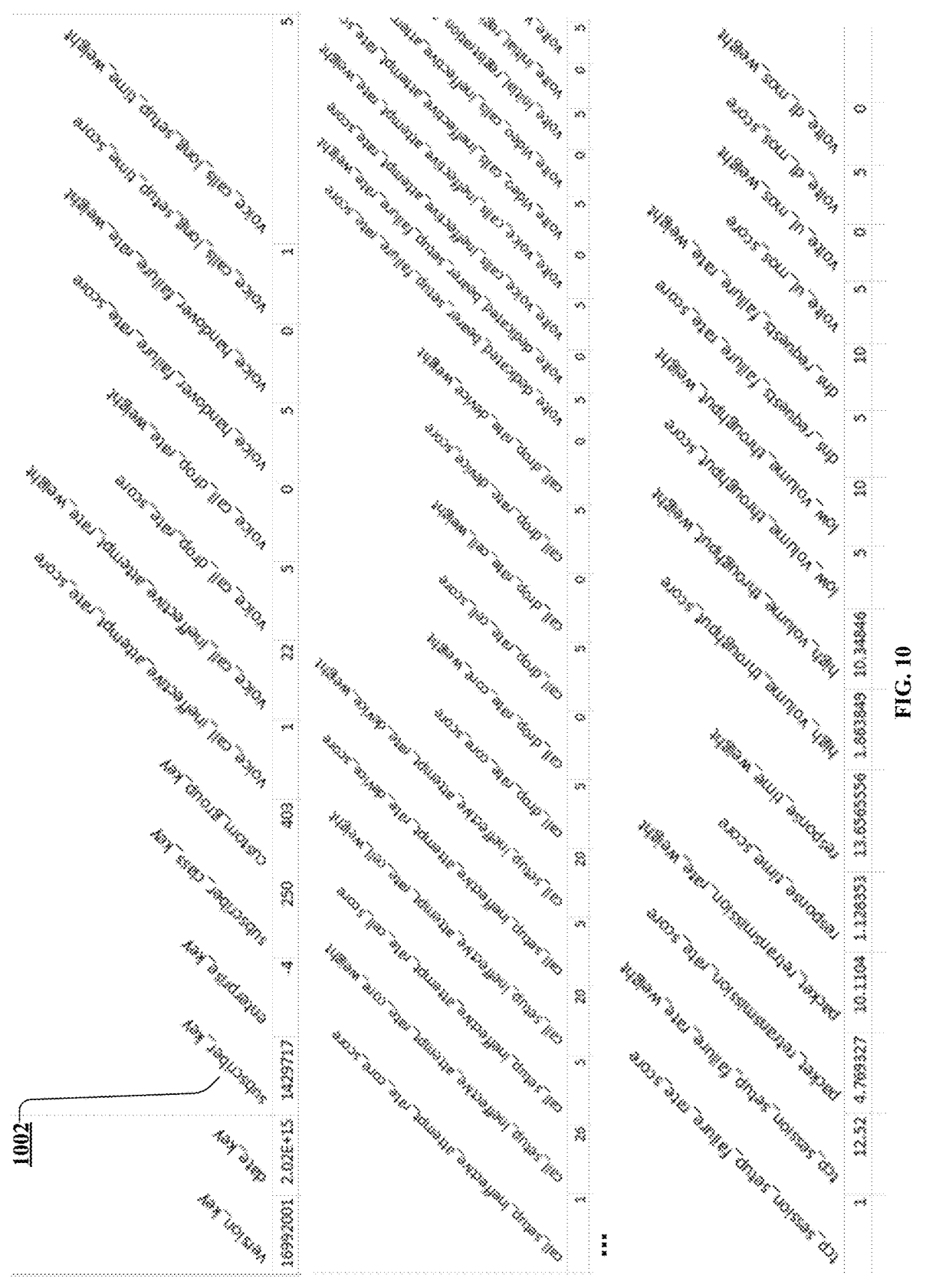

FIG. 10 shows an excerpt of the SKQIs calculated for a specific subscriber to the network.

FIG. 11 and FIG. 12 show excerpts of the automatically generated SQL for use in calculation of KQIs and QoE. FIG. 11 shows a command that inserts field values from SKQI-to-KQI-and-SKQI-to-QoE mappings table for calculations of KQI and QoE. FIG. 12 shows excerpts of the generated SQL that are executable for calculating KQIs.

DETAILED DESCRIPTION

Figure 1:
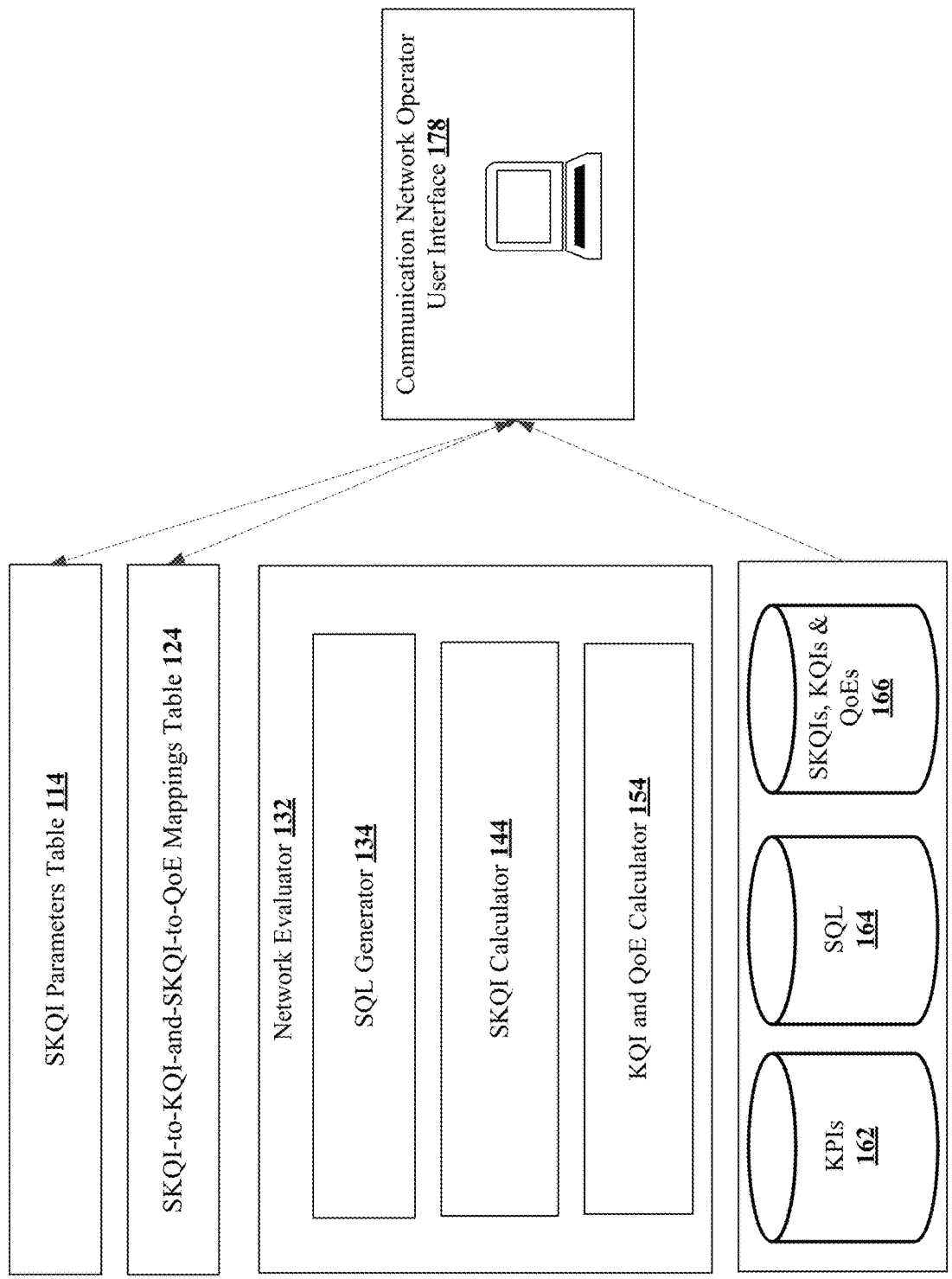
FIG. 1 depicts an exemplary system for automating evaluation of quality of experience (QoE) for data communication services in a diverse wireless communications network, according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Network performance measurement streams include complex long-term trends, rough cyclical patterns and outliers. Quality of experience (QoE) models need to be designed with an eye toward continuous improvement using objective feedback measures for individual subscribers, and performance changes need to be measured to identify degraded network performance as quickly as possible.

Applicant has refined roll-up from performance indicators to quality of experience aggregate metrics in several iterations, to meet customer needs in a technologically efficient way. In an early iteration, which qualifies as prior art, simple formulas for roll-up were illustrated in spreadsheets for programmers and then hard coded into roll-up routines. However, the alerts that customers wanted to generate and, importantly, to avoid generating, required more sophisticated rules and better technology than hard coding.

One example of alerts that customers wanted to avoid generating was dropped calls as users travel beyond the network's cellular coverage. There are locations that are too remote for cell towers or too rural to justify closely spaced cell towers, such as near Devil's Slide, south of San Francisco on the coast. Another example would be increased call drops during rush hour on some metropolitan highways.

More sophisticated rules were needed to address time varying loads, local cellular geography and individual customer experience. The new rules, which are not prior art, were expressed in spreadsheets such as in FIGS. 4a and 4b. The spreadsheets were refined during initial testing. The increased rule complexity and updating during development of rule parameters created substantial problems for hard coding, including difficulty, time required and error proneness.

The disclosed technology, which combines table driven roll-up and table driven SQL generation with reference to time varying experience data, was developed in response to the new needs and released to production in 2018. More sophisticated rules were combined with new technologies for implementing rules. Time-varying and user-specific alerts were implemented. Using tables to drive complex aggregations made it easier to implement complex formulas and eliminated the need for editing hard coded routines with each update to rule parameters. Using tables to generate code to invoke the table driven aggregation reduced error proneness. The table-driven approach was much different than and improved on hard coding. In the process, the more granular, time varying and user-specific analysis were implemented using the new technology.

The system disclosed in "Predicting Subscriber Experience Based on QoE", which is hereby incorporated by reference for all purposes, implements a heuristic model to calculate the QoE for an individual subscriber, based on the performance of services used by that subscriber during a defined time interval or set of time intervals. The QoE scores are usable to analyze trends in QoE over time and to compare QoE between different subscriber populations. The QoE scores can also be used to identify abnormal network performance, by detecting unexpected decreases in QoE values. The system enhances the application of the QoE model by using the volume of impacted intervals over a time period as a predictor of subscriber experience. A higher count of impacted intervals represents a more significant unsatisfactory experience, and a lower count of impacted intervals may only represent an insignificant or un-noticed glitch in the overall experience.

Over time, as network engineers modify and update existing metrics to improve network performance monitoring and analysis, a need arises to modify the set of parameters and variables used to calculate the QoE for subscribers. Also new clients may utilize different or modified metrics for measuring performance for their wireless networks. Additionally, new key performance indicators emerge as technology advances—such as for emerging technologies for next-generation 5G networks for wireless communications, with vastly increased capacity, lower latency and faster speeds. Another example modification to the set of parameters and variables used to calculate the QoE for subscribers is the removal of 2G KPIs as legacy systems get updated to emerging technologies. To update calculations that utilize modifications of existing KPIs and to add new performance indicators, existing network measurement systems must be updated. Historically this editing process has been time-consuming and potentially error-prone because edits to the complex calculation scenarios have been manually hard coded by human operators, to accommodate changes and additions to KPIs and SKQIs used to calculate QoEs.

The disclosed technology for evaluation of quality of experience (abbreviated QoE) with data communication services in a diverse communications network includes automatic generation of SQL statements for calculating KQIs and QoEs for measuring network performance. This automation saves time and increases accuracy for network performance monitoring. Next we describe example system architecture for automating evaluation of QoE with data communication services.

FIG. 1 shows example architecture 100 for automating evaluation of quality of experience for data communication services in a diverse telecommunications network. Architecture 100 includes network evaluator 132 for automatically generating SQL statements and for calculating SKQIs, KQIs and QoE. Network evaluator 132 includes SQL generator 134 that produces SQL functions usable for calculating SKQIs, KQIs and QoE, using parameters and values for the wireless network, and stores the generated SQL functions in SQL 164. Example SQL functions are described relative to FIG. 8 and FIG. 9 infra. In a second implementation, compiled code, such as code written in C, can be utilized for the functions. Compiled code will often run in effective time frames. Network evaluator 132 also includes SKQI calculator 144 that mathematically determines SKQIs using KPIs 162 and generated SQL functions stored in SQL 164 and stores the calculated SKQIs in SKQIs, KQIs and QoEs 166. Network evaluator 132 also includes KQI and QoE calculator 154 that computes KQIs and QoE using KPIs 162 and generated SQL functions stored in SQL 164 and stores the calculated KQIs and QoE in SKQIs, KQIs and QoEs 166.

Continuing with the description of FIG. 1, architecture 100 for automating evaluation of QoE from user-defined relationships to end results uses data from two included tables: SKQI parameters table 114 which is described in detail relative to FIG. 3 infra and SKQI-to-KQI-and-SKQI-to QoE mappings table 124 which is described in detail relative to FIG. 4. Architecture 100 also includes communication network operator user interface 178 for receiving alerts based on QoE and for managing SKQI parameters and SKQI and QoE mappings, modifying the set of parameters and variables used to calculate the QoE for subscribers and adding new and different metrics for new clients and for new technologies for wireless communications networks.

Figure 2:
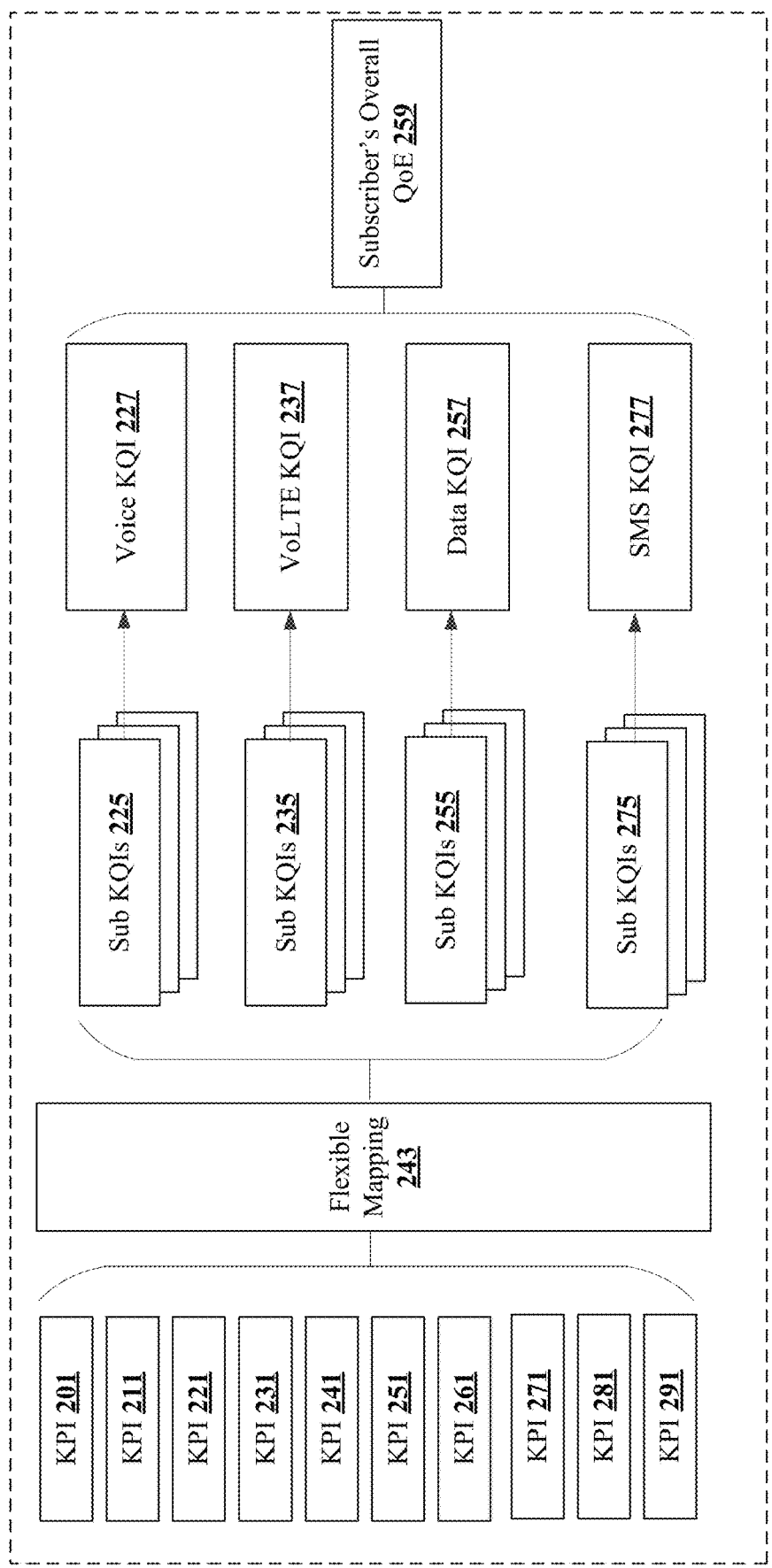
FIG. 2 graphically depicts the mapping of performance indicators referred to as KPIs, through intermediate quality sub-indicators referred to as SKQIs, to key quality indicators referred to as KQIs, to a subscriber's overall QoE.

FIG. 2 graphically depicts the mapping of performance indicators referred to as KPIs 201, 211, 221, 231, 241, 251, 261, 271, 281, 291 with flexible mapping 243 to intermediate quality sub-indicators referred to as sub KQIs 225, 235, 255, 275 to key quality indicators for voice KQI 227, VoLTE KQI 237, data KQI 257 and SMS KQI 277. The key quality indicators map to a subscriber's overall QoE 259.

FIG. 3A shows an excerpt of example SKQI parameters table 114 in which each of more than fifty rows represents a mapping of KPIs 306 listed in column H (and column I not shown) to SKQI 304 in column B. Note that the other columns of SKQI parameters table 114 are hidden in FIG. 3A which shows a partial list of the KPI to SKQI mappings in the example SKQI parameters table 114.

Figure 3B:
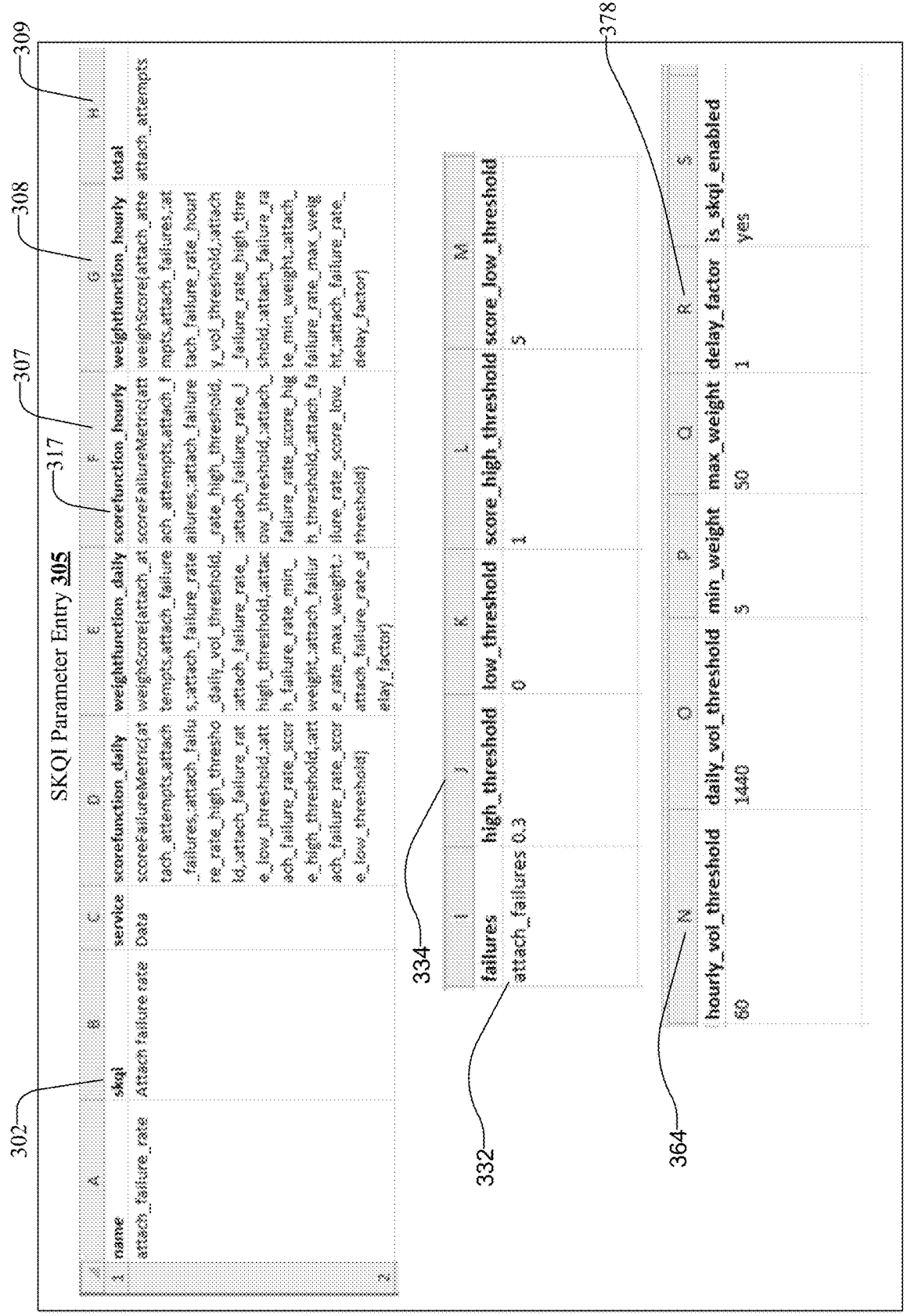
FIG. 3B displays a single row of an example SKQI parameters table with mappings for performance indicators to SKQIs.

FIG. 3B displays a single row of SKQI parameters table 114 with mappings for KPIs to SKQIs for an example SKQI parameter entry 305. The example shows the mapping of KPIs "attach_attempts" 309 and "attach_failures" 332, the values of which change dynamically dependent on the network, to SKQI "attach failure rate" 302. Column J 334 through column R 378 hold constants and variables used in the calculation of the SKQI. A daily score function and daily weight function, and an hourly score function and hourly weight function are computed using the macros defined in columns D, E, F and G respectively. In another example, thousands of columns of constants and variables can be interpreted individually, using the disclosed technology.

The scoreFailureMetric function utilizes values of variables stored in SKQI parameters table 114 along with monitored performance indicators to calculate an hourly score 307 for SKQI "attach failure rate" 302 from column F 307 as listed next. The hourly score function 307 gets generated using scoreFailureMetric function 317, in this example. Functions can be implemented in compiled high-level languages such as C and C++, in one example. In another example, functions can be implemented using SQL statements. In the example scoreFailureMetric function 317, also listed next, variable names with no colon prefix refer to names of monitored performance indicators from KPIs 162 in one example, and variable names with a colon prefix refer to constants in the SKQI parameters table 114 that is being read.

scoreFailureMetric(attach_attempts,attach_failures,:attach_failure_rate_high_threshold,: attach_failure_rate_low_threshold,: attach_failure_rate_score_high_threshold, :attach_failure_rate_score_low_threshold)

The function for calculating an hourly weight as listed in column G 308 for SKQI "attach failure rate" 302 is listed next.

weighScore(attach_attempts, attach_failures,:attach_failure_rate_hourly_vol_threshold,: attach_failure_rate_high_threshold,:attach_failure_rate_min_weight,: attach_failure_rate_max_weight,:attach_failure_rate_delay_factor)

Figure 4A:
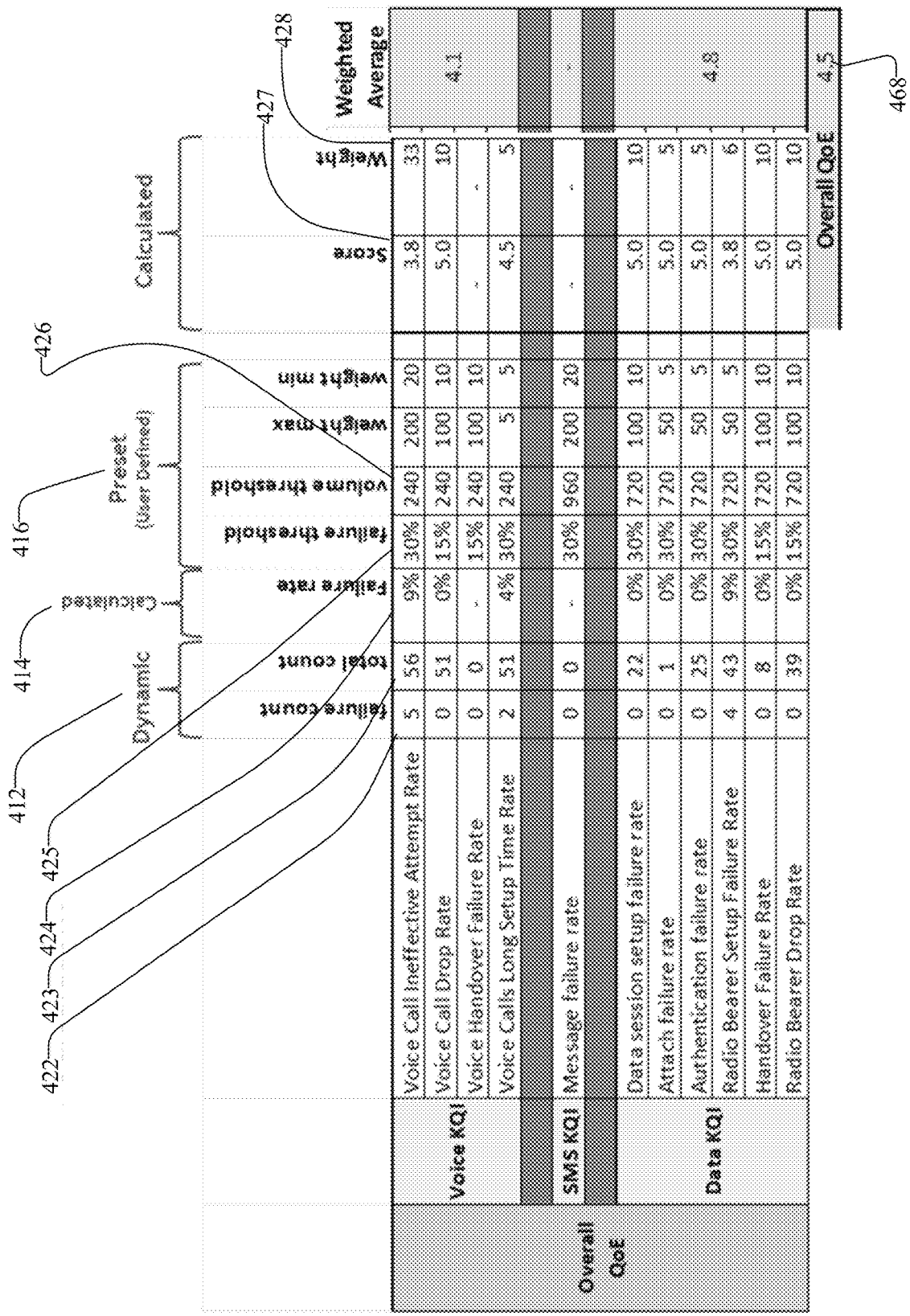
FIG. 4A illustrates the use of calculated KQI scores and weights.

Example use of calculated scores and weights are illustrated in FIG. 4A and in "Predicting Subscriber Experience Based on QoE", which is incorporated by reference. FIG. 4A illustrates one use of calculated KQI scores and weights. Daily failure threshold, volume threshold, weight maximum and weight minimum are preset 416 for voice, SMS and data. The daily failure threshold is preset to thirty percent 425 and the volume threshold is preset, in the example, to two-hundred forty 426. The KPIs for failure count and total count of calls are dynamic 412. The QoE calculation for this example data is described next. For a daily call volume of fifty-six calls 423, with a failure count of five 422, the failure rate is calculated as 5/56 which is nine percent 424. The failure rate ratio is the ratio of the calculated failure rate 414 to the preset failure rate threshold 425, which results in a failure rate ratio of nine percent divided by thirty percent, which is approximately thirty percent. Taking into account the preset min/max weight of 20/200 yields a calculated weight of thirty-three 428. The weighted average for voice KQI is calculated by multiplying the calculated score 427 by the calculated weight 428, adding the products for the four elements together, and dividing by the sum of the weights. In the example of FIG. 4A the weighted average for voice KQI calculation: $(3.8 \times 33 + 5.0 \times 10 + 4.5 \times 5)/(33+10+5) = 4.1$. A similar calculation is completed for data KQI. The weighted averages are then averaged to obtain the overall QoE value of 4.5 468. In this example scenario the data yields a calculated overall high QoE. When there is no data for a KPI 434, no weight 438 is applied and the KPI does not affect the weighted average. This example illustrates the use of calculated scores and weights, such as those described relative to FIG. 3A and FIG. 3B supra, for data communication services in a diverse wireless communications network.

Figure 4B:
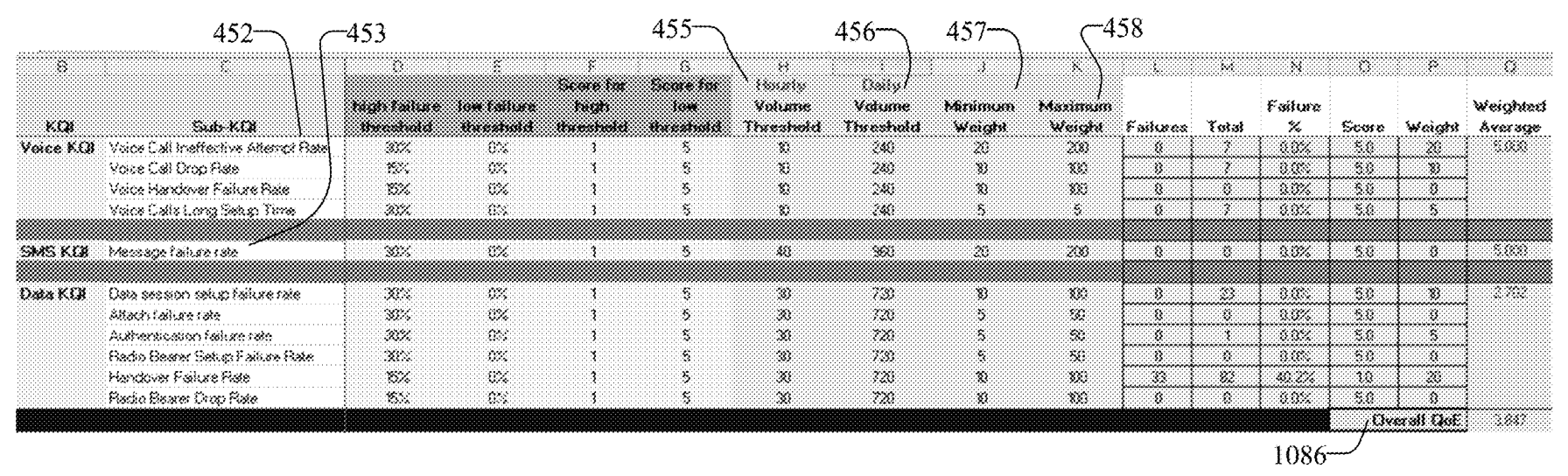

FIG. 4B illustrates another use case example that utilizes calculated scores and weights. In FIG. 4B, hourly volume thresholds 455 and daily volume thresholds 456 are utilized for calculating the SKQIs and KQIs each have a default value range of one through five, in which five is good and one is bad. Each SKQI has a minimum weight 457 and a maximum weight 458, with higher weights assigned to the more important SKQI, such as voice call ineffective attempt rate 452 and SMS failure rate 453. The overall QoE 486 takes into account the weighted average of all the KQI scores.

FIG. 5 shows an excerpt of an example SKQI-to-KQI-and-SKQI-to-QoE mapping table of SKQIs 506 to KQIs 509 for data, voice, SMS and VoLTE services 507. The full example table (not shown) includes over one hundred thirty mappings, displayed as one mapping per row of the table. Name 504 is the variable name used for calculating the KQI or QoE in the SQL functions and for a given row mapping, SKQI 506 employs a human readable description to refer to the same SKQI.

FIG. 6 shows an excerpt of an example SKQI-to-KQI-and-SKQI-to-QoE mapping table, filtered to show SKQIs 606 mapped to calculation of cell KQI 608. KQI and QoE calculator 154 utilizes eleven distinct SKQI rows 702 in the computation of cell KQI 708 and stores the calculated KQI in SKQIs, KQIs and QoEs 166. The SKQIs mapped to the calculation of cell KQI 608 include the SKQIs in following list.

call_ drop_ rate_ cell
call_setup_ineffective_attempt_rate_cell
data_session_setup_failure_rate_cell
message_failure_rate_cell
rab_drop_rate_cell
rab_handover_failure_rate
rab_setup_failure_rate_cell
volte_video_calls_drop_rate_cell
volte_video_calls_ineffective_attempt_rate_cell
volte_voice_calls_drop_rate_cell
volte_voice_calls_ineffective_attempt_rate_cell FIG. 7 shows an excerpt of SKQI-to-KQI-and-SKQI-to-QoE mapping table, filtered for calculating QoE 708. FIG. 7 makes use of the same example SKQI-to-KQI-and-SKQI-to QoE mapping table shown in FIG. 5 and FIG. 6, this time filtered for calculation of QoE 708. Twenty-six SKQIs 706 map to calculating QoE 708. The twenty-six SKQIs in rows 702 are combined by averaging them over the number of SKQIs.

SQL generator 134 produces first structured query language (SQL) statements for calculating the SKQIs in response to the mappings stored in SKQI parameters table 114. FIG. 8 and FIG. 9 show excerpts of the automatically generated SQL for use in calculation of SKQIs. FIG. 8 shows insert command 804 that inserts field values from SKQI parameters table 114 for use in agg_d_sub_kqi_f 806 including "authentication_failure_rate_score" 814 and "authentication_failure_rate_weight" 824. FIG. 9 shows excerpts of the generated SQL that are executable for calculating SKQIs. Note that the SQL includes over two hundred lines, of which only a few lines are shown in FIG. 8 and FIG. 9. Line 237 shows the call to the scoreFailureMetric function 944 for calculating the attach_failure_ rate_score 958.

scoreFailureMetric(attach_attempts,attach_failures,:attach_failure_rate_high_threshold,: attach_failure_rate_low_threshold,: attach_failure_rate_score_high_threshold,: attach_failure_rate_score_low_threshold) as attach_failure_rate_score Line 238 954 shows the call to the weighScore function 954 for calculating the attach_failure_rate_weight 968.

weighScore(attach_attempts,attach_failures,:attach_failure_rate_daily_vol_threshold,: attach_failure_rate_high_threshold,:attach_failure_rate_min_weight,: attach_failure_rate_max_weight,:attach_failure_rate_delay_factor) as attach_failure_rate_weight FIG. 10 shows an excerpt of results of the first SQL statements. The SKQI results for a specific subscriber to the network who is identified with subscriber key 1002 are shown as a single row of values. The SKQIs are calculated by executing the generated SQL statements described relative to FIG. 8 and FIG. 9. More than one hundred twenty columns of data hold at least a hundred calculated SKQIs. In a different implementation, thousands of columns of data and mappings are used for evaluation of quality of experience (QoE) for data communication services in a diverse wireless communications network.

SQL generator 134 also produces second SQL statements that, when executed, invoke the second function to calculate the KQIs from results of the first SQL statements. The second SQL statements invoke functions for calculating KQIs and QoE in response to the mappings stored in SKQI-to-KQI-and-SKQI-to-QoE mappings table 124. FIG. 11 and FIG. 12 show excerpts of the automatically generated SQL for use in calculation of KQIs and QoE. FIG. 11 shows insert command 1104 that inserts field values from SKQI-to-KQI-and-SKQI-to QoE mappings table 124 for use by agg_d_sub_kqi_f 1106 for calculations of KQI and QoE, including "cell_kqi" 1134 and QoE labelled "qoe" 1154. FIG. 12 shows excerpts of the generated SQL that are executable for invoking function weightedAvg 1234 for calculating KQIs cell_kqi 1248 and weightedAvg 1254 for volte_kqi_device 1268. Note that the SQL includes many statements for calculating KQIs, of which only a few lines are shown in FIG. 11 and FIG. 12.

Figure 13:
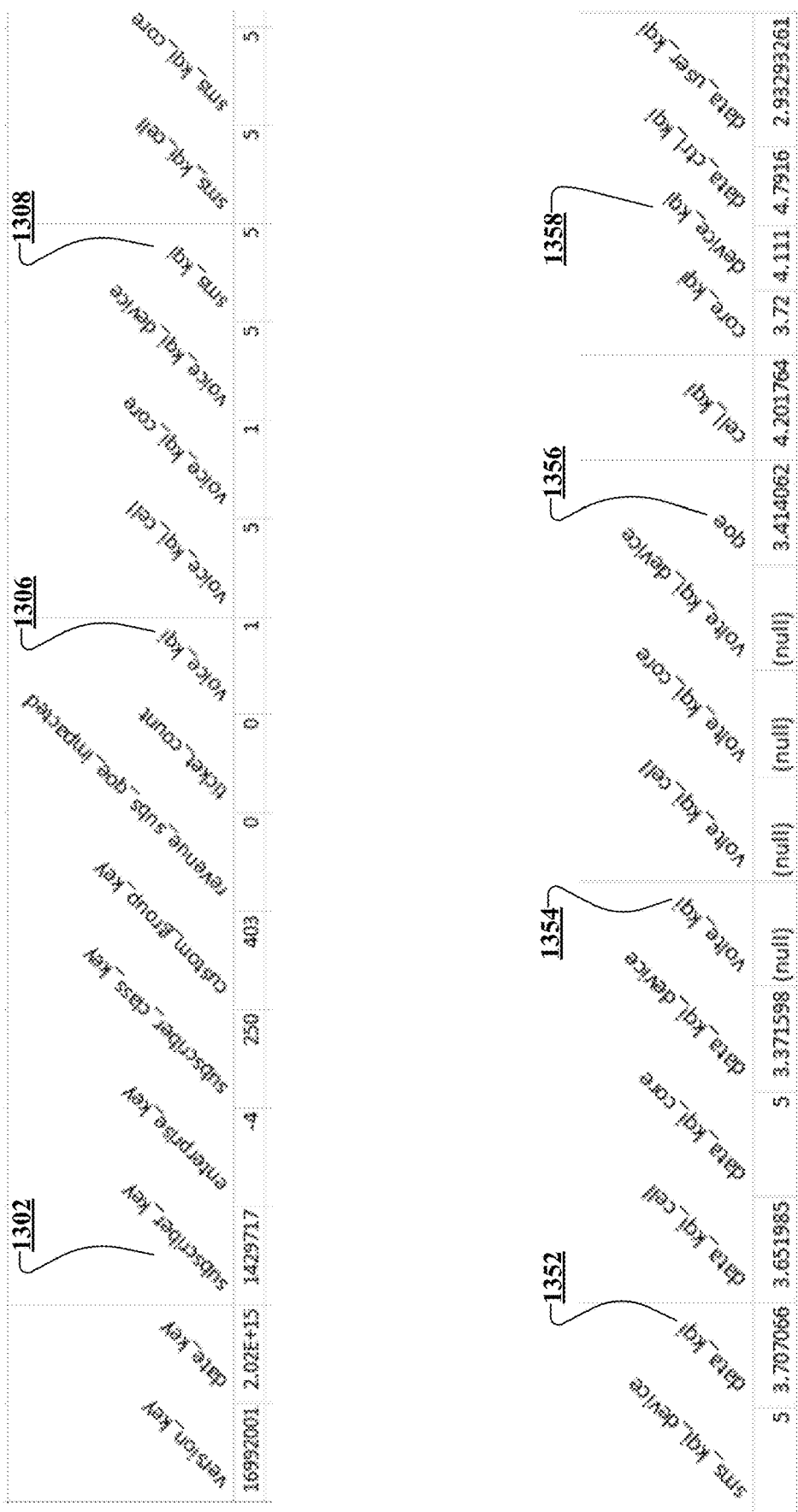
FIG. 13 shows an example set of KQIs and QoE calculated, using the second SQL statements, for a specific subscriber to the communication network.

FIG. 13 shows an excerpt of results of the second SQL statements. The example shows the set of KQIs and QoE calculated for a specific subscriber identified using subscriber key 1302. The KQIs and QoE are calculated by executing the generated SQL statements described relative to FIG. 11 and FIG. 12. More than twenty KQIs and QoE results are calculated, including voice_kqi 1306, sms_kqi 1308, data_kqi 1352, volte_kqi 1354, device_kqi 1358 and qoe 1356. The example illustrates, for an individual subscriber, the disclosed technology, which combines table driven roll-up and table driven SQL generation with reference to time varying experience data. That is, automating evaluation of QoE for data communication services in a diverse wireless communications network utilizes monitored performance indicators KPIs 162, SKQI parameters table 114 and SKQI-to-KQI-and-SKQI-to-QoE mappings table 124 for configuring functions, generating SQL statements, and executing the generated SQL that calculates SKQIs, KQIs and QoE. Next we describe a system for automating evaluation of QoE, which increases monitoring accuracy and saves time, for network performance evaluation.

Computer System

Figure 14:
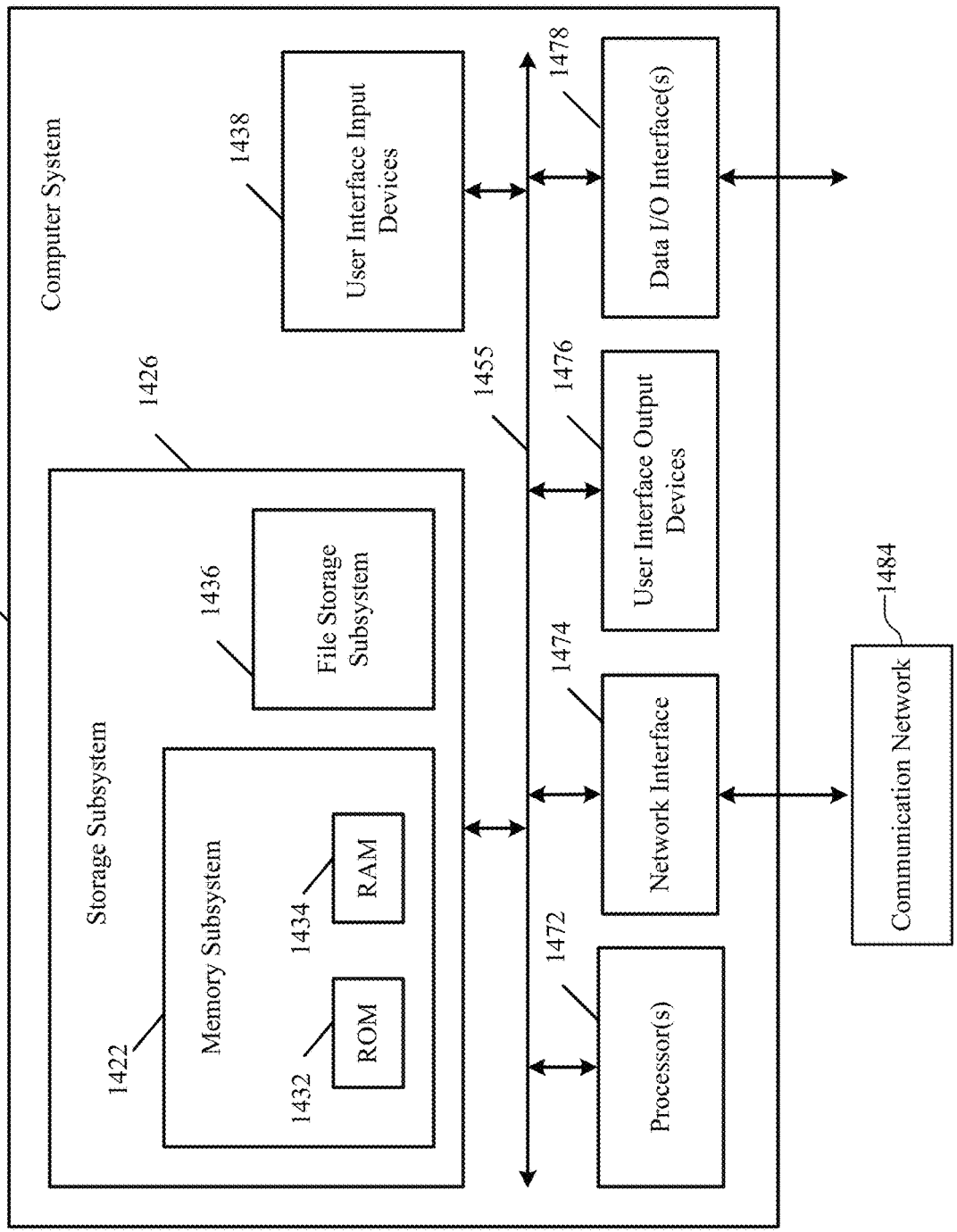
FIG. 14 depicts a block diagram of an exemplary system for automating evaluation of quality of experience (QoE) for data communication services in a diverse wireless communications network, according to one implementation of the technology disclosed.

FIG. 14 is a simplified block diagram of a computer system 1400 that can be used for automating evaluation of QoE for data communication services in a diverse wireless communications network, according to one implementation of the technology disclosed.

Computer system 1400 includes at least one central processing unit (CPU) 1472 that communicates with a number of peripheral devices via bus subsystem 1455. These peripheral devices can include a storage subsystem 1410 including, for example, memory devices and a file storage subsystem 1436, user interface input devices 1438, user interface output devices 1476, and a network interface subsystem 1474. The input and output devices allow user interaction with computer system 1400. Network interface subsystem 1474 provides an interface to outside networks, including an interface to corresponding interface devices in other computer systems.

In one implementation, the network hosts of FIG. 1 can be communicably linked to the storage subsystem 1410 and the user interface input devices 1438. User interface input devices 1438 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1400.

User interface output devices 1476 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1400 to the user or to another machine or computer system.

Storage subsystem 1410 stores programming and data constructs that provide the functionality of some or all of the modules and methods described herein.

Memory subsystem 1422 used in the storage subsystem 1410 can include a number of memories including a main random access memory (RAM) 1432 for storage of instructions and data during program execution and a read only memory (ROM) 1434 in which fixed instructions are stored. A file storage subsystem 1436 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1436 in the storage subsystem 1410, or in other machines accessible by the processor.

Bus subsystem 1455 provides a mechanism for letting the various components and subsystems of computer system 1410 communicate with each other as intended. Although bus subsystem 1455 is shown schematically as a single bus, alternative implementations of the bus subsystem can use multiple busses.

Computer system 1410 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1400 depicted in FIG. 14 is intended only as a specific example for purposes of illustrating the preferred embodiments of the present invention. Many other configurations of computer system 1400 are possible having more or less components than the computer system depicted in FIG. 14.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method of automating evaluation of quality of experience (QoE) for data communication services in a diverse wireless communications network includes accessing monitored performance indicators, accessing mappings for the performance indicators to sub key quality indicators (abbreviated SKQIs) represented by constants and variables stored in an SKQI parameters table, and accessing mappings for SKQIs to key quality indicators (KQIs) in an SKQI-to-KQI mapping table. The disclosed method also includes configuring first and second functions that, respectively roll up the performance indicators into SKQIs based on parameters stored in the SKQI parameters table, by calculating SKQI scores and weights, and roll up SKQIs into KQIs based on parameters stored in the SKQI-to-KQI mapping table by calculating KQI scores. The disclosed method further includes generating first structured query language (SQL) statements that, when executed, invoke the first function to calculate the SKQIs from the performance indicators and second SQL statements that, when executed, invoke the second function to calculate the KQIs from results of the first SQL statements. The method also includes storing the generated first SQL statements and second SQL statements in non-volatile storage.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Some implementations of the disclosed method further include calculating the SKQIs by executing the generated first SQL statements and calculating the KQIs by executing second SQL statements, and storing the calculated SKQIs and KQIs in non-volatile storage.

For some implementations, the calculating and storing are repeated periodically at a frequency from every minute to daily. In some cases the calculating and storing are repeated hourly.

One implementation of the disclosed technology further includes comparing KQIs for a current time window to past KQIs for a corresponding time window in a weekly KQI profile, for individual users operating mobile devices in part of a cellular network that is a focus of interest, and based on the comparing, generating alerts that report out-of-range current KQIs within the focus of interest that are persistently out-of-range longer than a configurable time.

For some implementations of the disclosed method, the first and second functions are implemented in executable compiled code. In another case, the first and second functions can be implemented in SQL.

In another implementation, a disclosed method of automating evaluation of quality of experience (QoE) for data communication services in a diverse wireless communications network includes accessing monitored performance indicators, accessing mappings for the performance indicators to sub key quality indicators (abbreviated SKQIs) represented by constants and variables stored in an SKQI parameters table, and accessing mappings for SKQIs to key quality indicators (abbreviated KQIs) in an SKQI-to-QoE mapping table. The disclosed method also includes configuring first and second functions that, respectively: roll up the performance indicators into SKQIs based on parameters stored in the SKQI parameters table, to calculate SKQI scores and weights, and roll up SKQIs into QoE based on parameters stored in the SKQI-to-QoE mapping table to calculate QoE scores. The disclosed method further includes generating first structured query language (SQL) statements that, when executed, invoke the first function to calculate the SKQIs from the performance indicators, and second SQL statements that, when executed, invoke the second function to calculate the QoE from results of the first SQL statements. The method also includes storing the generated first SQL statements and second SQL statements in non-volatile storage.

One implementation of the disclosed method further includes calculating the SKQIs by executing the generated first SQL statements and calculating the QoE by executing second SQL statements, and storing the calculated SKQIs and QoE in non-volatile storage.

Some implementations of the disclosed method further include comparing calculated QoE for a current time window to past QoE for a corresponding time window in a weekly QoE profile for individual users operating mobile devices in part of a cellular network that is a focus of interest, and based on the comparing, generating alerts that report out-of-range current QoE within the focus of interest that are persistently out-of-range longer than a configurable time.

In another implementation, a disclosed system includes one or more processors coupled to memory, the memory loaded with computer instructions, when executed on the processors, implement actions of the disclosed method described supra.

In yet another implementation a disclosed tangible non-transitory computer readable storage media impressed with computer program instructions that, when executed on a processor, implement the disclosed methods described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of automating evaluation of quality of experience (QoE) for data communication services in a wireless communications network including:

monitoring time varying performance indicators that are based on calls made by one or more individual subscribers of the wireless communications network;

accessing the monitored time varying performance indicators of the one or more individual subscribers;

accessing mappings for the performance indicators of the one or more individual subscribers to sub key quality indicators (SKQIs) represented by constants and variables stored in a dynamically changing SKQI parameters table;

accessing mappings for SKQIs to key quality indicators (KQIs) in a dynamically changing SKQI-to-KQI-and-SKQI-to-QoE mapping table;

configuring first and second functions, wherein:
  the first function is configured to roll up the performance indicators of the one or more individual subscribers into SKQIs based on parameters stored in the SKQI parameters table, by calculating SKQI scores and weights; and
  the second function is configured to roll up the SKQIs into KQIs based on parameters stored in the SKQI-to-KQI-and-SKQI-to-QoE mapping table by calculating KQI scores; and automatically generating first structured query language (SQL) statements based on the first function, wherein the first SQL statements, when executed,
  insert field values for mappings from the dynamically changing SKQI parameters table, and invoke the first function to calculate the SKQIs from the performance indicators of the one or more individual subscribers in response to the inserted mappings;

executing the automatically generated first SQL statements,
  thereby inserting field values for mappings from the dynamically changing SKQI parameters table, and
  invoking the first function to calculate the SKQIs from the performance indicators of the one or more individual subscribers;

automatically generating second SQL statements based on the second function, wherein the second SQL statements, when executed,
  insert field values for mappings from the dynamically changing SKQI-to-KQI-and-SKQI-to-QoE mappings table, and invoke the second function to calculate the KQIs from results of the first SQL statements in response to the mappings stored in the dynamically changing SKQI-to-KQI-and-SKQI-to-QoE mapping table;

executing the automatically generated second SQL statements,
  thereby inserting field values for mappings from the dynamically changing SKQI-to-KQI-and-SKQI-to-QoE mapping table, and
  invoking the second function to calculate the KQIs from the results of the first SQL statements; and using resulting SKQI and KQI values with QoE values for display to a network operator to indicate a degree of abnormal network performance being experienced by an individual subscriber.

2. The method of claim 1, further including storing the automatically generated first SQL statements, the second SQL statements, and the calculated SKQIs and KQIs in non-volatile storage.

3. The method of claim 2, wherein the calculating and storing are repeated periodically at a frequency from every minute to daily.

4. The method of claim 1, further including comparing KQIs for a current time window to past KQIs for a corresponding time window in a weekly KQI profile, for individual users operating mobile devices in part of a cellular network that is a focus of interest; and based on the comparing, generating alerts that report out-of-range current KQIs within the focus of interest that are persistently out-of-range longer than a configurable time.

5. The method of claim 1, wherein the first and second functions are implemented in executable compiled code.

6. A method of automating evaluation of quality of experience (QoE) for data communication services in a wireless communications network including:

monitoring time varying performance indicators that are based on calls made by one or more individual subscribers of the wireless communications network;

accessing the monitored time varying performance indicators of the one or more individual subscribers;

accessing mappings for the performance indicators of the one or more individual subscribers to sub key quality indicators (SKQIs) represented by constants and variables stored in a dynamically changing SKQI parameters table;

accessing mappings for SKQIs to key quality indicators (KQIs) in a dynamically changing SKQI-to-QoE mapping table;

configuring first and second functions, wherein:

the first function is configured to roll up the performance indicators of the one or more individual subscribers into SKQIs based on parameters stored in the SKQI parameters table, to calculate SKQI scores and weights; and the second function is configured to roll up the SKQIs into the QoE based on parameters stored in the SKQI-to-QoE mapping table to calculate QoE scores; and automatically generating first structured query language (SQL) statements based on the first function, wherein the first SQL statements, when executed, insert field values for mappings from the dynamically changing SKQI parameters table, and invoke the first function to calculate the SKQIs from the performance indicators of the one or more individual subscribers in response to the inserted mappings;

executing the automatically generated first SQL statements, thereby inserting field values for mappings from the dynamically changing SKQI parameters table, and invoking the first function to calculate the SKQIs from the performance indicators of the one or more individual subscribers;

automatically generating second SQL statements based on the second function, wherein the second SQL statements, when executed, insert field values for mappings from the dynamically changing SKQI-to-QoE mappings table, and invoke the second function to calculate the QoE from results of the first SQL statements;

executing the automatically generated second SQL statements, thereby inserting field values for mappings from the dynamically changing SKQI-to-QoE mapping table, and invoking the second function to calculate the QoEs from the results of the first SQL statements; and using a resulting SKQI and QoE values for display to a network operator to indicate a degree of abnormal network performance being experienced by an individual subscriber.

7. The method of claim 6, further including storing the automatically generated first SQL statements, the second SQL statements, and the calculated SKQIs and QoE in non-volatile storage.

8. The method of claim 7, wherein the calculating and storing are repeated periodically at a frequency from every minute to hourly.

9. The method of claim 6, further including comparing calculated QoE for a current time window to past QoE for a corresponding time window in a weekly QoE profile for individual users operating mobile devices in part of a cellular network that is a focus of interest; and based on the comparing, generating alerts that report out-of-range current QoE within the focus of interest that are persistently out-of-range longer than a configurable time.

10. The method of claim 6, wherein the first and second functions are implemented in executable compiled code.

11. A tangible non-transitory computer readable storage medium impressed with computer program instructions that, when executed, automate evaluation of quality of experience (QoE) for data communication services in a wireless communications network by performing operations including:

monitoring time varying performance indicators that are based on calls made by one or more individual subscribers of the wireless communications network;

accessing the monitored time varying performance indicators of the one or more individual subscribers;

accessing mappings for the performance indicators of the one or more individual subscribers to sub key quality indicators (SKQIs) represented by constants and variables stored in a dynamically changing SKQI parameters table;

accessing mappings for SKQIs to key quality indicators (KQIs) in a dynamically changing SKQI-to-KQI-and-SKQI-to-QoE mapping table;

configuring first and second functions, wherein:

the first function is configured to roll up the performance indicators of the one or more individual subscribers into SKQIs based on parameters stored in the SKQI parameters table, by calculating SKQI scores and weights; and the second function is configured to roll up the SKQIs into KQIs based on parameters stored in the dynamically changing SKQI-to-KQI-and-SKQI-to-QoE mapping table by calculating KQI scores; and automatically generating first structured query language (SQL) statements based on the first function, wherein the first SQL statements, when executed, insert field values for mappings from the dynamically changing SKQI parameters table, and invoke the first function to calculate the SKQIs from the performance indicators of the one or more individual subscribers in response to the inserted mappings;

executing the automatically generated first SQL statements, thereby inserting field values for mappings from the dynamically changing SKQI parameters table, and invoking the first function to calculate the SKQIs from the performance indicators of the one or more individual subscribers;

automatically generating second SQL statements based on the second function, wherein the second SQL statements, when executed, insert field values for mappings from the dynamically changing SKQI-to-KQI-and-SKQI-to-QoE mappings table, and invoke the second function to calculate the KQIs from results of the first SQL statements in response to the mappings stored in the dynamically changing SKQI-to-KQI-and-SKQI-to-QoE mapping table;

executing the automatically generated second SQL statements, thereby inserting field values for mappings from the dynamically changing SKQI-to-KQI-and-SKQI-to-QoE mapping table, and invoking the second function to calculate the KQIs from the results of the first SQL statements;

using resulting SKQI and KQI values with QoE values for display to a network operator to indicate a degree of abnormal network performance being experienced by an individual subscriber.

12. The tangible non-transitory computer readable storage medium of claim 11, further including storing the automatically generated first SQL statements, the second SQL statements, and the calculated SKQIs and KQIs in non-volatile storage.

13. The tangible non-transitory computer readable storage medium of claim 12, wherein the calculating and storing are repeated periodically at a frequency from every minute to hourly.

14. The tangible non-transitory computer readable storage medium of claim 11, further including comparing KQIs for a current time window to past KQIs for a corresponding time window in a weekly KQI profile for individual users operating mobile devices in part of a cellular network that is a focus of interest; and based on the comparing, generating alerts that report out-of-range current KQIs within the focus of interest that are persistently out-of-range longer than a configurable time.

15. The tangible non-transitory computer readable storage medium of claim 11, wherein the first and second functions are implemented in executable compiled code.

16. A tangible non-transitory computer readable storage medium impressed with computer program instructions that, when executed, automate evaluation of quality of experience (QoE) for data communication services in a wireless communications network by performing operations including:

monitoring time varying performance indicators that are based on calls made by one or more individual subscribers of the wireless communications network;

accessing the monitored performance indicators of the one or more individual subscribers;

accessing mappings for the performance indicators of the one or more individual subscribers to sub key quality indicators (SKQIs) represented by constants and variables stored in a dynamically changing SKQI parameters table;

accessing mappings for SKQIs to key quality indicators (KQIs) in a dynamically changing SKQI-to-QoE mapping table;

configuring first and second functions, wherein:

the first function is configured to roll up the performance indicators of the one or more individual subscribers into SKQIs based on parameters stored in the SKQI parameters table, to calculate SKQI scores and weights; and the second function is configured to roll up the SKQIs into the QoE based on parameters stored in the dynamically changing SKQI-to-QoE mapping table to calculate QoE scores; and automatically generating first structured query language (SQL) statements based on the first function, wherein the first SQL statements, when executed, insert field values for mappings from the dynamically changing SKQI parameters table, and invoke the first function to calculate the SKQIs from the performance indicators of the one or more individual subscribers in response to the inserted mappings;

executing the automatically generated first SQL statements, thereby inserting field values for mappings from the dynamically changing SKQI parameters table, and invoking the first function to calculate the SKQIs from the performance indicators of the one or more individual subscribers;

automatically generating second SQL statements based on the second function, wherein the second SQL statements, when executed, insert field values for mappings from the dynamically changing SKQI-to-QoE mappings table, and invoke the second function to calculate the QoE from results of the first SQL statements;

executing the automatically generated second SQL statements, thereby inserting field values for mappings from the dynamically changing SKQI-to-QoE mapping table, and invoking the second function to calculate the QoEs from the results of the first SQL statements; and using a resulting SKQI and QoE values for display to a network operator to indicate a degree of abnormal network performance being experienced by an individual subscriber.

17. The tangible non-transitory computer readable storage medium of claim 16, further including storing the automatically generated first SQL statements, the second SQL statements, and the calculated SKQIs and QoE in non-volatile storage.

18. The tangible non-transitory computer readable storage medium of claim 17, wherein the calculating and storing are repeated periodically at a frequency from every minute to hourly.

19. The tangible non-transitory computer readable storage medium of claim 16, further including comparing calculated QoE for a current time window to past QoE for a corresponding time window in a weekly QoE profile for individual users operating mobile devices in part of a cellular network that is a focus of interest; and based on the comparing, generating alerts that report out-of-range current QoE within the focus of interest that are persistently out-of-range longer than a configurable time.

20. A system for automating evaluation of quality of experience (QoE) for data communication services in a wireless communications network, the system including one or more processors coupled to the tangible non-transitory computer readable storage medium of claim 11.

21. A system for automating evaluation of quality of experience (QoE) for data communication services in a wireless communications network, the system including one or more processors coupled to the tangible non-transitory non-transitory computer readable storage medium of claim 16.

22. The method of claim 1, wherein the monitored performance indicators of the one or more individual subscribers of the wireless communication network include performance values of the wireless communication network with respect to the one or more individual subscribers.

* * * * *